United States Patent
Sindhu et al.

(10) Patent No.: US 8,687,976 B1
(45) Date of Patent: Apr. 1, 2014

(54) OPTICAL ACCESS NETWORK HAVING EMITTER-FREE CUSTOMER PREMISE EQUIPMENT AND ADAPTIVE COMMUNICATION SCHEDULING

(71) Applicant: Juniper Networks, Inc., Sunnyvale, CA (US)

(72) Inventors: Pradeep Sindhu, Los Altos Hills, CA (US); Jayabharat Boddu, Los Altos, CA (US); Roberto Marcoccia, San Jose, CA (US); Theodore John Schmidt, Gilroy, CA (US); Christian Malouin, San Jose, CA (US); Abhijit Kumar Choudhury, Cupertino, CA (US); James Michael Murphy, Alameda, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/842,240

(22) Filed: Mar. 15, 2013

Related U.S. Application Data

(60) Provisional application No. 61/737,813, filed on Dec. 16, 2012.

(51) Int. Cl.
*H04J 14/02* (2006.01)
(52) U.S. Cl.
USPC ............................................. 398/168; 398/68
(58) Field of Classification Search
USPC ..................................... 398/68–72, 168–170
See application file for complete search history.

(56) References Cited

U.S. PATENT DOCUMENTS

| 5,221,983 | A   | * | 6/1993 | Wagner ............................ 398/72 |
| 7,103,277 | B2  | * | 9/2006 | Ridgway .......................... 398/72 |
| 7,184,437 | B1  |   | 2/2007 | Cole et al. |
| 2002/0135843 | A1 | * | 9/2002 | Gruia ............................. 359/167 |
| 2008/0044181 | A1 |   | 2/2008 | Sindhu |
| 2012/0141140 | A1 | * | 6/2012 | Neilson et al. ................ 398/171 |

OTHER PUBLICATIONS

U.S. Appl. No. 13/248,834, by Srinivasa Chaganti dated Sep. 29, 2011.

* cited by examiner

*Primary Examiner* — Leslie Pascal
(74) *Attorney, Agent, or Firm* — Shumaker & Sieffert, P.A.

(57) ABSTRACT

An access network includes an access device having an optical interface module that outputs a plurality of pairs of optical communication signals, each of the pairs of optical communication signals comprising a modulated optical transmit signal and an unmodulated optical receive signal, each of the pairs of optical communication signals having a different wavelength. A customer premise equipment (CPE) comprises an optical interface module to receive the modulated optical transmit signal and the unmodulated optical receive signal for any of the plurality of pairs of optical communication signals. The optical interface module includes a receive module to demodulate the modulated optical transmit signal into inbound symbols and a transmit module having an optical modulator and reflective optics to modulate the unmodulated optical receive signal in accordance with a data signal and reflect a modulated optical receive signal to communicate outbound data symbols to the access device.

18 Claims, 7 Drawing Sheets

OPTICAL ACCESS NETWORK HAVING EMITTER-FREE CUSTOMER PREMISE EQUIPMENT AND ADAPTIVE COMMUNICATION SCHEDULING

This application claims the benefit of U.S. Provisional Application No. 61/737,813, filed Dec. 16, 2012, the entire content of which is incorporated herein by reference.

TECHNICAL FIELD

The invention relates to computer networks and, more specifically, access networks for customer premise equipment.

BACKGROUND

Various types of devices connect to service provider networks to access services provided by packet-based data networks, such as the Internet, enterprise intranets, and virtual private networks (VPNs). For example, many computers utilize fixed communication links, such as optical, digital subscriber line, or cable-based connections, of service provider networks to access the packet-based services. Similarly, wireless devices, such as cellular or mobile smart phones and feature phones, tablet computers, and laptop computers, utilize mobile connections such as cellular radio access networks of the service provider networks to access the packet-based services. In some cases, access networks make use of fiber optics to provide high-speed point-to-point connectivity between customer premise equipment (CPE) and an upstream access device.

In this way, the service provider networks typically provide an extensive access network infrastructure to provide packet-based data services to service provider network access devices to provide access to the offered services. Access devices, such as high-speed aggregation routers, are often positioned near the edge of the service provider network upstream from the CPEs and typically provide an anchor for managing subscriber sessions. The access devices typically provide mechanisms for identifying subscriber traffic and apply subscriber policies to manage subscriber traffic on a per-subscriber basis as such traffic traverses the service provider core network boundary.

SUMMARY

In general, an access network is described that provides a comprehensive solution to limitations of current access networks. As further described herein, the techniques may allow a service provider to leverage existing optical infrastructure yet achieve a significant degree of statistical multiplexing gain ("stat mux gain") with respect to the infrastructure. This, in turn, may allow the service provider to amortize a cost associated with high-end components of the access network across significantly more subscribers than current access networks allow.

In one example, an access device, such as an access router, is described that provides an optical interface capable of optically communicating with a plurality of different customer premise equipment (CPE) through a common optical interface. The access router may, for example, communicate with the CPEs through a passive optical network using wave division multiplexing. As such, a set of CPEs serviced by the common optical interface of the access router may communicate with the access router using a different wavelength. That is, in this example, the optical interface of the router transmits modulated optical communications to the CPEs at particular wavelengths for different set of CPEs. An N port (e.g., 40 port) comb filter may, for example, be used for wave division multiplexing the modulated optical signal at each wavelength to respective downstream sets of one or more CPEs, thereby providing for concurrent downstream communication through a common optical interface of the access router.

Further, techniques are described for incorporating low-cost, optical emitter-free CPEs within the access network. For example, in addition to outputting a modulated optical transmit signal to each CPE, the optical interface of the access router outputs a separate, non-modulated optical carrier at each of the wavelengths to be used by the CPEs for subsequent upstream communications. As explained herein, each of the CPEs may incorporate a specialized optical interface that utilizes reflective optics for upstream communications. Each of the CPEs receives the non-modulated optical carrier at a particular wavelength depending upon the port of the comb filter to which the subscriber device is connected, modulates the optical carrier with any data to be transmitted upstream, and reflects the optical carrier in modulated form upstream to the access router. In some cases, the non-modulated optical carrier may be at a different wavelength than its associated modulated optical transmit signal.

In this way, multiple CPEs are able to achieve bi-directional communication with the access router through a single optical interface of the access router even though the CPEs are optical emitter (e.g., laser) free. Moreover, each CPE may utilize a broadband modulator, i.e., a modulator that is relatively insensitive to wavelength, to modulate the upstream optical carrier signal received from the access router. As such, each CPE need not include specialized interface components tailored for particular wavelengths and may avoid the cost associated with laser-based transmitters. As such, low-cost CPEs may be achieved that may be easily deployed to subscribers without regard to, or needing configuration for, specific wavelengths or ports of the comb filters used within the access network. In this way, a low-cost, low-complexity, highly-scalable access network may be achieved that provides high-speed, bi-directional optical communications.

In some examples, the access network may further utilize optical splitters for the optical communications associated with each of the different wavelengths provided by the optical interface of the access router. For example, each port of the comb filter may be connected to an optical splitter so as to provide the upstream and downstream optical signals for that wavelength to a plurality of different CPEs for communicating at the same wavelength. An optical interface of the access router provides an execution environment for a plurality of schedulers, one for each port of the comb filter coupled to the optical interface, i.e., one for each wavelength. Each scheduler dynamically services data transmission requests for the set of CPEs communicating at the given wavelength, i.e., the set of CPEs coupled to a common port of the comb filter by an optical splitter, thereby allowing the access network to dynamically schedule data transmissions so as to utilize otherwise unused communication bandwidth.

In one example, a network system comprises an access device comprising an optical interface module that outputs a plurality of pairs of optical communication signals, each of the pairs of optical communication signals comprising a modulated optical transmit signal and an unmodulated optical receive signal, each of the pairs of optical communication signals having a different wavelength; and a customer premise equipment (CPE) comprising an optical interface module to receive the modulated optical transmit signal and the unmodulated optical receive signal for any of the plurality of pairs of optical communication signals, wherein the optical interface module includes a receive module to demodulate the modulated optical transmit signal into inbound symbols and a transmit module having an optical modulator and reflective optics to modulate the unmodulated optical receive signal in accordance with a data signal and reflect a modulated optical receive signal to communicate outbound data symbols to the access device.

In another example, a method comprises outputting, with an optical interface module of an access device, a plurality of pairs of optical communication signals, each of the pairs of optical communication signals comprising a modulated optical transmit signal and an unmodulated optical receive signal, each of the pairs of optical communication signals having a different wavelength; receiving, with an optical interface of a customer premise equipment (CPE), the modulated optical transmit signal and the unmodulated optical receive signal of any of the plurality of pairs of optical communication signals; demodulating, with the optical interface of the CPE, the modulated optical transmit signal into inbound symbols; modulating, with the optical interface of the CPE, the unmodulated optical receive signal in accordance with a data signal to produce a modulated optical receive signal of outbound data symbols; and reflecting, with the optical interface of the CPE, the modulated optical receive signal back to the access device to communicate the outbound data symbols to the access device.

In another example, an access device comprises a plurality of interfaces; and a switch fabric to forward network packets between the plurality of interfaces, wherein at least one of the interfaces comprises an optical interface module that outputs a plurality of pairs of optical communication signals, and wherein each of the pairs of optical communication signals comprises a modulated optical transmit signal to transmit outbound symbols to a respective customer premise equipment (CPE) and an unmodulated optical receive signal to receive inbound symbols from the respective CPE.

In another example, a method comprises outputting, with an optical interface module of an access device, a plurality of pairs of optical communication signals to a plurality of customer premise equipment (CPE), each of the pairs of optical communication signals comprising a modulated optical transmit signal to transmit outbound symbols to a respective set of one or more of the CPEs and an unmodulated optical receive signal to receive inbound symbols from the respective set of the CPEs; receiving, from the CPEs, the optical receive signals as modulated and reflected back by the CPEs; and demodulating the optical receive signals to recover inbound symbols transmitted by the CPEs.

The method may further comprise scheduling, for each of the pairs of optical communication signals, (i) downstream communication to the CPEs by the modulated optical transmit signals, and (ii) upstream communication from the CPEs by the optical receive signal.

The method may further comprise scheduling the upstream communication from the CPEs based on round trip delay times for the unmodulated optical receive signals output to the CPEs by the access device so output symbols transmitted by the CPEs arrive at the access device at different communication time slots.

The method may further comprise forwarding the recovered inbound symbols to a network as packet-based communications.

As another example, a customer premise equipment comprises an optical interface module to receive a modulated optical transmit signal and an unmodulated optical receive signal from an access device, wherein the optical interface module comprises: a receive module to demodulate the modulated optical transmit signal into inbound symbols; and a transmit module having an optical modulator and reflective optics to modulate the unmodulated optical receive signal in accordance with a data signal and reflect a modulated optical receive signal to communicate outbound data symbols to the access device.

The techniques described herein may provide certain advantages. For example, the techniques may allow a service provider to amortize a cost associated with a high-end access router across significantly more CPEs than current access networks allow. In other words, the techniques may be applied such that the access routers provide a significant degree of statistical multiplexing gain ("stat mux gain") to the service provider. The service provider may, therefore, be able to leverage existing passive infrastructure to support high-bandwidth, bursty communication requirements for high-volumes of subscribers (e.g., tens of thousands) without requiring the service provider to build-out additional infrastructure.

Moreover, the advantages described herein may be achieved while utilizing low-cost, low-complexity CPEs that may be easily deployed and maintained within the access network. Further, existing, passive optical components of the access network may be utilized, thereby providing high-speed connectivity without requiring high expense associated with a wholesale upgrade to an expansive access network.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
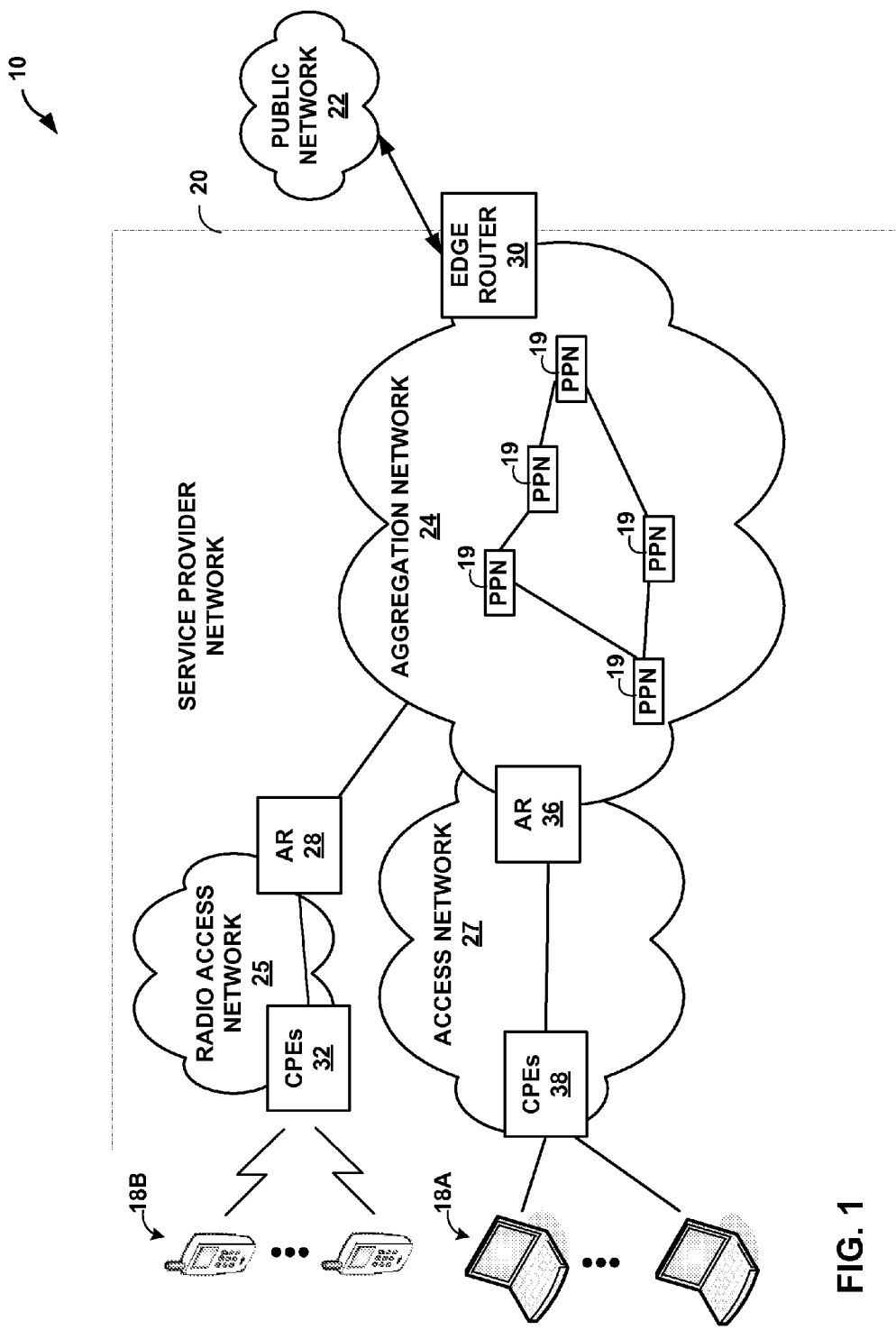
FIG. 1 is a block diagram illustrating an example network system in accordance with techniques described herein.

FIG. 1 is a block diagram illustrating an example network system 10 in accordance with techniques described herein. As shown in the example of FIG. 1, network system 10 includes a service provider network 20 coupled to a public network 22. Service provider network 20 operates as a private network that provides packet-based network services to subscriber devices 18A, 18B (herein, "subscriber devices 18"). Subscriber devices 18A may be, for example, personal computers, laptop computers or other types of computing device associated with subscribers. Subscriber devices 18B may comprise, for example, mobile telephones, laptop or desktop computers having, e.g., a 3G wireless card, wireless-capable netbooks, video game devices, pagers, smart phones, personal data assistants (PDAs) or the like. Each of subscriber devices 18 may run a variety of software applications, such as word processing and other office support software, web browsing software, software to support voice calls, video games, videoconferencing, and email, among others.

In the example of FIG. 1, service provider network 20 includes an access network 27 with an access router (AR) 36 and customer premises equipment (CPEs) 38 that provide subscriber devices 18A with access to aggregation network 24. In some examples, AR 36 may comprise a router that maintains routing information between subscriber devices 18A and aggregation network 24. AR 36, for example, typically includes Broadband Remote Access Server (BRAS) functionality to aggregate output from one or more CPEs 38 into a higher-speed uplink to aggregation network 24. Moreover, AR 36 provides an anchor point of active sessions for subscriber devices 18A. In this sense, AR 36 may maintain session data and operate as a termination point for communication sessions established with subscriber devices 18A that are currently accessing packet-based services of public network 22 via aggregation network 24.

CPE 38 may communicate with AR 36 over a physical interface supporting various protocols, e.g., ATM interface supporting ATM protocols. CPE 38 may comprise a switch, a router, a gateway, or another terminal that operates as a demarcation point between customer equipment, such as subscriber devices 18B, and service provider equipment. In one example, CPE 38 may comprise a digital subscriber line access multiplexer (DSLAM) or other switching device. Each of subscriber devices 18A may utilize a Point-to-Point Protocol (PPP), such as PPP over ATM or PPP over Ethernet (PPPoE), to communicate with CPE 38. For example, using PPP, one of subscriber devices 18 may request access to aggregation network 24 and provide login information, such as a username and password, for authentication by policy server (not shown). Other embodiments may use other lines besides DSL lines, such as cable, Ethernet over a T1, T3 or other access links.

As shown in FIG. 1, service provider network 20 may include a radio access network 25 with an access router (AR) 28 and CPE 32 that provide subscriber devices 18B with access to aggregation network 24 via radio signals. For example, CPE 32 may be connected to one or more wireless radios or base stations (not shown) to wirelessly exchange packetized data with subscriber devices 18B. CPE 32 may comprise a switch, a router, a gateway, or another terminal that aggregates the packetized data received from the wireless radios to AR 28. The packetized data may then be communicated to aggregation network 24 of the service provider, and ultimately to public network 22.

Aggregation network 24 provides session management, mobility management, and transport services to support access, by subscriber devices 18B, to public network 22. AR 28 provides an anchor point of active sessions for subscriber devices 18B. Similar to AR 36, AR 28 may maintain session data and operate as a termination point for communication sessions established with subscriber devices 18B that are currently accessing packet-based services of public network 22 via aggregation network 24. Examples of a high-end mobile gateway device that manages subscriber sessions for mobile devices are described in U.S. patent application Ser. No. 13/248,834, entitled MOBILE GATEWAY HAVING REDUCED FORWARDING STATE FOR ANCHORING MOBILE SUBSCRIBERS," the entire content of which is incorporated herein by reference.

Aggregation network 24 provides data service access to public network 22 and may comprise, for instance, a general packet radio service (GPRS) core packet-switched network, a GPRS core circuit-switched network, an IP-based mobile multimedia core network, or another type of transport network. Aggregation network 24 typically includes one or more packet processing nodes ("PPN") 19, such as internal routers and switches, and appliances to provide security services, load balancing, billing, deep-packet inspection (DPI), and other services for mobile traffic traversing aggregation network 24. After authentication and establishment of network access through access network 27 or radio access network 25, any one of subscriber devices 18 may begin exchanging data packets with public network 22 with such packets traversing ARs 28, 36 and PPNs 19.

In some examples, one or more of access network 27 and radio access network 25 may comprise an optical access network. For example, AR 36 may comprise an optical line terminal (OLT) connected to one or more CPEs or optical network units (ONUs) via optical fiber cables. In this case, AR 36 may convert electrical signals from aggregation network 24 to optical signals using an optical emitter, i.e., a laser, and a modulator. AR 36 then transmits the modulated optical signals over one or more optical fiber cables to the CPEs, which act as termination points of the optical access network. As one example, CPE 38 converts modulated optical signals received from AR 36 to electrical signals for transmission to subscriber devices 18A over copper cables. As one example, CPE 38 may comprise a switch located in a neighborhood or an office or apartment complex capable of providing access to a plurality of subscriber devices 18A. In other examples, such as fiber-to-the-home (FTTH), CPE 38 may comprise a gateway located directly at a single-family premise or at an individual business capable of providing access to the one or more subscriber devices 18A at the premise. In the case of radio access network 25, the CPEs may be connected to wireless radios or base stations and convert the modulated optical signals to electrical signals for transmission to subscriber devices 18B via wireless signals.

In general, an optical access network may be an active optical network or a passive optical network (PON). In the case of an active optical network, access networks 25, 27 include powered splitters configured to divide the optical carrier signal into multiple signals and route each of the signals to a specific CPE with associated subscriber devices requesting the data transported by the optical carrier signal. Active optical networks may be difficult to deploy because they require a power source to divide and route the optical carrier signal.

As described herein, access networks 25, 27 may provide a comprehensive solution to limitations of current access networks. The techniques may allow service provider network 20 to leverage existing optical infrastructure of access networks 25, 27 yet achieve a significant degree of statistical multiplexing gain ("stat mux gain") with respect to the infrastructure. This, in turn, may allow the service provider to amortize a cost associated with high-end components of the access network across significantly more subscribers than current access networks allow.

In one example, ARs 28, 36 provide optical interfaces that are each capable of optically communicating with a plurality of different customer premise equipment (CPEs) through a common optical interface. Access router 36 may, for example, communicate with CPEs 38 through a passive optical network using wave division multiplexing. As such, CPEs 38 serviced by the common optical interface of access router 36 may communicate with access router 36 using a different wavelength. That is, in this example, the optical interface of access router 36 transmits modulated optical communications to subscriber devices 18A at particular wavelengths for the different CPEs. An N-port (e.g., 40-port) comb filter may, for example, be used for wave division multiplexing the modulated optical signal at each wavelength to respective downstream CPEs 38, thereby providing for concurrent downstream communication through a common optical interface of access router 36.

Further, techniques are described for incorporating low-cost, optical emitter-free CPEs 32, 38 within access network 25, 27. For example, in addition to outputting a modulated optical transmit signal to each of CPEs 38, an optical interface of access router 36 outputs a separate, non-modulated optical carrier at each of the wavelengths to be used by CPEs 38 for subsequent upstream communications. As explained herein, each of CPEs 38 may incorporate a specialized optical interface that utilizes reflective optics for upstream communications. Each of CPEs 38 receives the non-modulated optical carrier at a particular wavelength depending upon the port of the comb filter to which the CPE is connected, modulates the optical carrier with any data to be transmitted upstream, and reflects the optical carrier in modulated form upstream to access router 36. In some cases, the non-modulated optical carrier may be at a different wavelength than its associated modulated optical transmit signal.

In this way, multiple CPEs 38 are able to achieve bi-directional communication with access router 36 through a single optical interface of the access router even though the CPEs are optical emitter (e.g., laser) free. Moreover, each of CPEs 38 may utilize a broadband modulator, i.e., a modulator that is relatively insensitive to wavelength, to modulate the upstream optical carrier signal received from access router 36. As such, each of subscriber devices 18A need not include specialized interface components tailored for particular wavelengths and may avoid the cost associated with laser-based transmitters. As such, low-cost CPEs 38 may be achieved that may be easily deployed to subscribers without regard to, or needing configuration for, specific wavelengths or ports of the comb filters used within the access network 27. AR 28 and CPEs 32 of radio access network 25 may function in a similar manner. In this way, a low-cost, low-complexity, highly-scalable access network may be achieved that provides high-speed, bi-directional optical communications.

Figure 4:
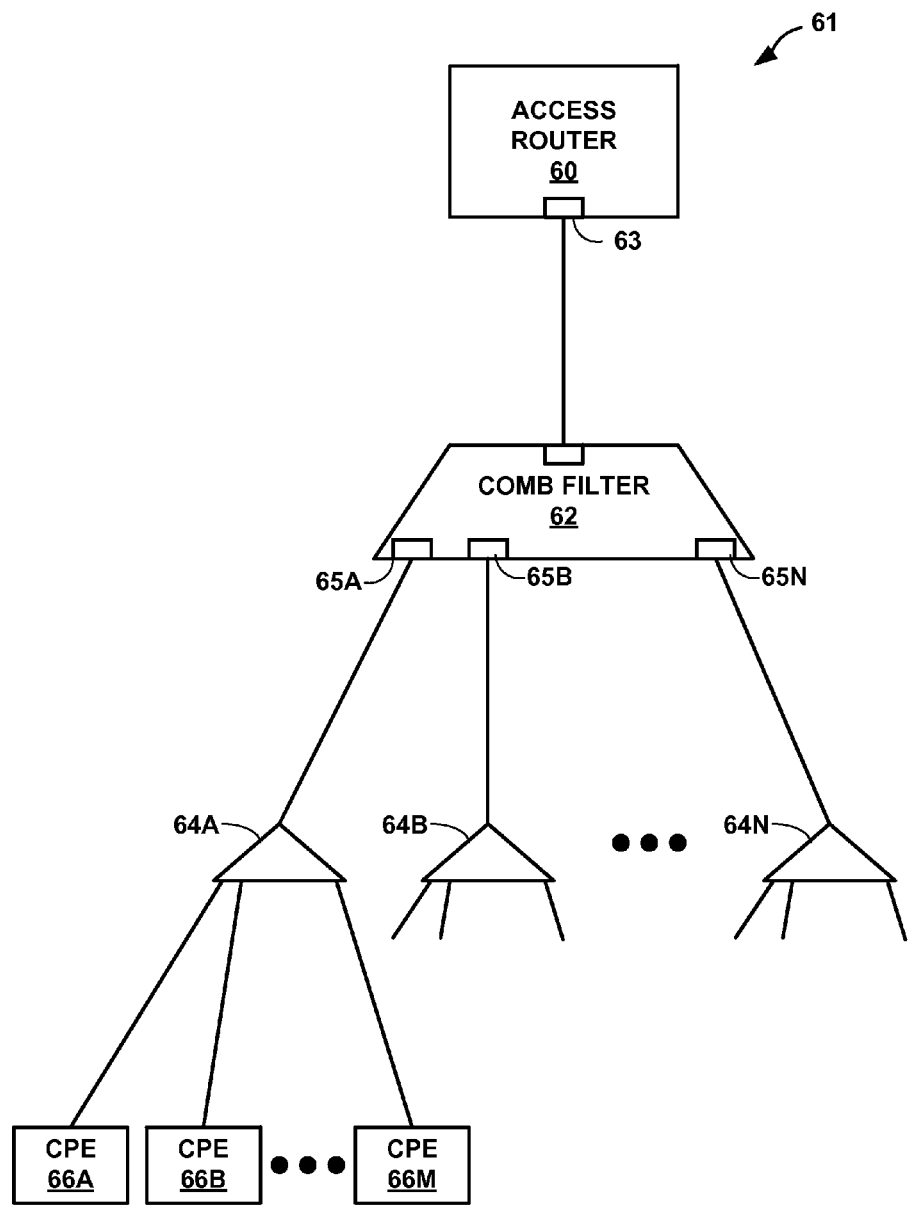
FIG. 4 is a schematic diagram illustrating a second example of an optical access network.

In some examples, as further shown in FIG. 4, access networks 25, 27 may further utilize optical splitters for the optical communications associated with each of the different wavelengths provided by the optical interfaces of access routers 28, 36. For example, each port of the comb filter may be connected to an optical splitter so as to provide the upstream and downstream optical signals for that wavelength to a plurality of different CPEs for communicating at the same wavelength. Each optical splitter divides the optical carrier signal into multiple signals with an even power distribution to each CPE. In one example, each passive splitter services up to 32 CPEs. Each of the optical signals produced by the optical splitter carries the exact same data to their respective CPEs, and the CPEs then drop the traffic that their associated subscribers are not interested in receiving.

In some examples, the optical interfaces of access routers 28, 36 provide an execution environment for a plurality of schedulers, one for each port of the comb filter coupled to the optical interface, i.e., one for each wavelength. Each scheduler dynamically services data transmission requests for the set of CPEs 32, 38 communicating at the given wavelength, i.e., the set of CPEs coupled to a common port of the comb filter by an optical splitter, thereby allowing the access network to dynamically schedule data transmissions so as to utilize otherwise unused communication bandwidth.

The techniques described herein may provide certain advantages. For example, the techniques may allow a service provider to amortize a cost associated with a high-end access router across significantly more CPEs than current access networks allow. In other words, the techniques may be applied such that the access routers provide a significant degree of statistical multiplexing gain ("stat mux gain") to the service provider. The service provider may, therefore, be able to leverage existing passive infrastructure to support high-bandwidth, bursty communication requirements for high-volumes of subscribers (e.g., tens of thousands) without requiring the service provider to build-out additional infrastructure.

Moreover, the advantages described herein may be achieved while utilizing low-cost, low-complexity CPEs that may be easily deployed and maintained within the access network. Further, existing, passive optical components of the access network may be utilized, thereby providing high-speed connectivity without requiring high expense associated with a wholesale upgrade to an expansive access network.

Figure 2:
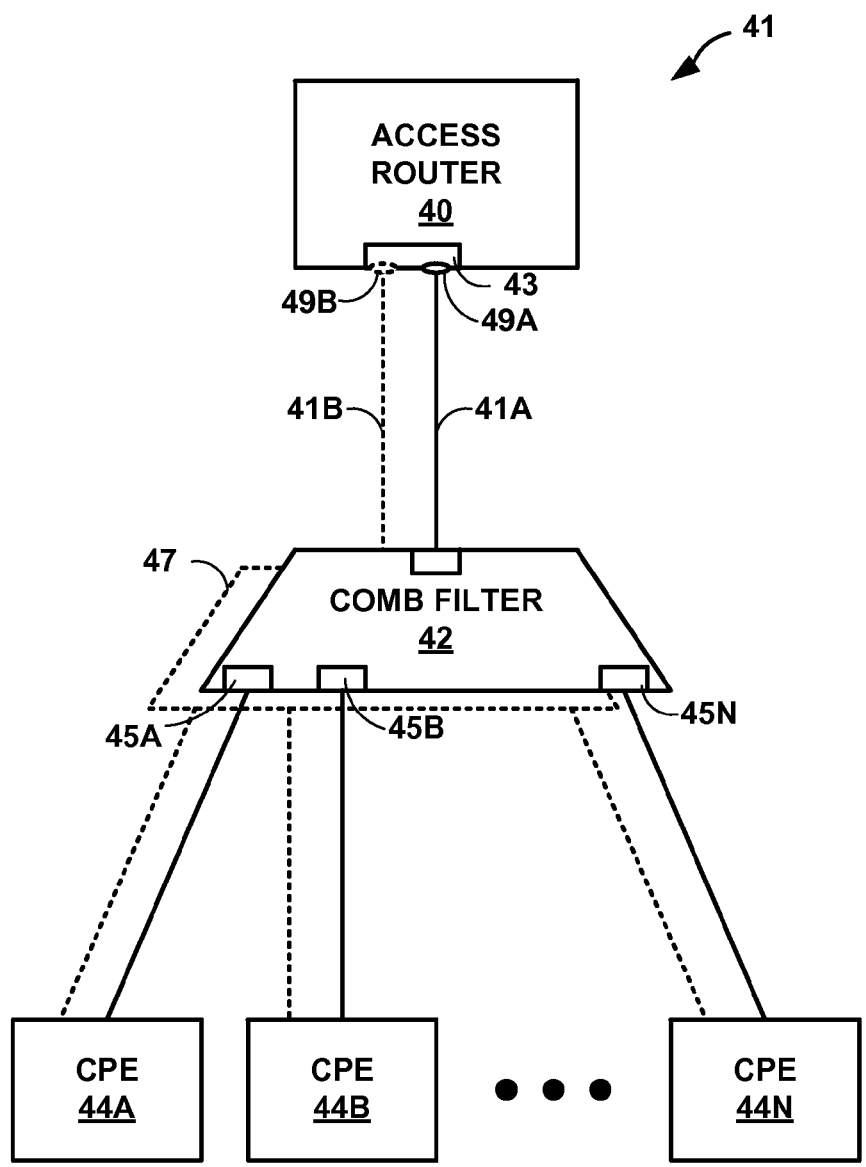
FIG. 2 is a schematic diagram illustrating one example of an optical access network of FIG. 1 in accordance with one or more techniques of this disclosure.

FIG. 2 is a schematic diagram illustrating one example of an optical access network of FIG. 1 in accordance with one or more techniques of this disclosure. Access router 40 and CPEs 44A-44N ("CPEs 44") of FIG. 2 may represent, for example, any of access routers 28, 36 and CPEs 32, 38 of FIG. 1.

In the example illustrated in FIG. 2, optical access network 41 comprises a PON that includes a wave division multiplex (WDM) comb filter 42 that divides an optical signal from optical interface 43 of access router 40 into different wavelengths without dividing the power. In this case, the original optical signal can be split off to a specific one of CPEs 44 based on a wavelength of the signal. That is, in this example, optical interface 43 of access router 40 transmits modulated optical communications to CPEs 44 at particular wavelengths for the different CPEs 44. An N-port (e.g., 40-port) comb filter 42 may, for example, be used for wave division multiplexing the modulated optical signal at each wavelength to respective downstream CPEs 44, thereby providing for concurrent downstream communication through a common optical interface 43 of access router 40. Optical interface 43 of access router 40 may include multiple optical emitters, e.g., lasers, for outputting multiple transmit optical signals at different wavelengths into a common fiber optic cable, each optical signal set to a different wavelength for a given one of ports 45A-45N ("ports 45") of comb filter 42 and, therefore, for communication with a different one of CPEs 44. In one example, comb filter 42 is capable of filtering between 40 different wavelengths. In this case, access router 40 may include up to 40 lasers set at different wavelengths, and access router 40 may provide a plurality of such optical interfaces to concurrently communicate with different groups of up to forty CPEs.

Further, in one example, CPEs 44 comprise low-cost, optical emitter-free CPEs within the access network. That is CPEs 44 may, in this example, utilize reflective optics rather than include any optical emitter, such as a laser. For example, in addition to outputting a modulated optical transmit signal to each CPE 44, optical interface 43 of access router 40 outputs a separate, non-modulated optical carrier at each of the wavelengths to be used by CPEs 44 for subsequent upstream communications. In some cases, the non-modulated optical carrier may be at a different wavelength than its associated modulated optical transmit signal. As explained herein in reference to FIG. 3, each of CPEs 44 may incorporate a specialized optical interface that utilizes reflective optics for upstream communications. Each of CPEs 44 receives the non-modulated optical carrier at a particular wavelength depending upon to which port 45 of comb filter 42 the CPE is connected. Each of CPEs 44 modulates the optical carrier with any data to be transmitted upstream, and the reflective optics of the CPE reflects the optical carrier in modulated form upstream to access router 40.

In this way, each of CPEs 44 connected to the same optical interface 43 of access router 40 by a single optical fiber avoids the need to include a transmit laser of a different wavelength to generate a return signal that will flow through comb filter 42. This avoids any cost and configuration challenges of incorporating transmit lasers supporting different wavelengths in different CPEs. For example, at very high or very low temperatures, a laser designed to transmit at a given wavelength may shift to a different wavelength unable to pass back through the comb filter. As such, the techniques avoid any expense of including thermally-tuned lasers for a specific wavelength within each CPE.

In this case, optical interface 43 of access router 40 comprises N pairs of laser for producing N pairs of optical communication signals. Each of the N pairs of optical communication signals includes a modulated optical transmit signal and an unmodulated optical receive signal, and each of the N pairs of optical communication signals has a different wavelength and corresponds to a different port 45 of comb filter 42. In this way, for each of CPEs 44, optical interface 43 of access router 40 provides a first optical signal at a given wavelength to transport outbound data symbols downstream through comb filter 42 to the one of CPEs 44 associated with the given wavelength. In addition, for each of CPEs 44, optical interface 43 of access router 40 provides a second optical signal at the same wavelength or at a different wavelength than the first optical signal for subsequent upstream communication from that same CPE using the reflective optics of the CPE. In the downstream direction from access router 40 to a given one of CPEs 44, the second optical signal is constant and not modulated.

When the CPE has data to transmit data back to access router 40, the CPE modulates the second optical signal received from access router 40 in accordance with a data signal, and the modulated second optical signal is reflected back to the access node through the comb filter. In some examples, the second optical signal is set at the same wavelength as the first optical signal. In this case, the first optical signal and the second optical signal may pass through the same one of ports 45 of comb filter 42 to the CPE, and the modulated second optical signal passes back through the same one of ports 45 of comb filter 42 to access router 40. In other examples, the second optical signal is set at a different wavelength than the first optical signal. In this case, the first optical signal may pass through one of ports 45 of comb filter 42 to the CPE, and the second optical signal may pass through a corresponding port of a second comb filter different than comb filter 42. The modulated second optical signal may pass back through the corresponding port of the second comb filter to access router 40. If the CPE does not have data to transmit back to access router 40, the unmodulated second optical signal may either be terminated at the CPE or reflected back to access router 40 in its unmodulated form.

In some cases, both the first and second optical signals may pass through the same comb filter 42 via optical fiber 41A. In other cases, the first and second optical signals may each pass through a different comb filter 42, 47 arranged in parallel. As one example, shown in dashed lines on FIG. 2, different comb filters 42, 47 may be used for the first and second optical signals because transmitting both the first and second optical signals at the same wavelength along the same comb filter may cause interference that could corrupt the data carried in the first optical signal. In this example, optical interface module 43 of access router 40 may have a first optical interconnect 49A to couple to a first optical fiber 41A and a second optical interconnect 49B to couple to a second optical fiber 41B. Moreover, optical interface 43 may be configured to provide the modulated optical transmit signal for each of the pairs of optical communication signals to the first optical fiber and the non-modulated optical receive signal for each of the pairs of optical communication signals to the second optical fiber. As another example, different comb filters may be used for the first and second optical signals when the signals are transmitted at different wavelengths but are destined for the same CPE.

In this manner, optical interface 43 of access router 40 may include two lasers to produce two light beams for each wavelength, one beam to carry the downstream signal to a given one of CPEs 44 and one used by the CPE to generate the upstream signal. Although this configuration may require up to two lasers for each CPE, and up to 80 lasers total in access router 40 for 40-port comb filter 42, no optical emitters, e.g., lasers, are required in any of CPEs 44. In this way, all CPEs 44 may be identical, i.e., not wavelength specific. In other cases, only one laser may be used to both carry the downstream signals to a given one of CPEs 44 and generate the upstream signals at the CPE by using different modulation schemes in the different directions. For example, if the downstream optical signal is modulated using a modulation scheme that is not based on amplitude, such as phase modulated or frequency modulated, then the CPE may modulate the same optical signal using amplitude modulation, e.g., on-off-keying (OOK), to generate the upstream optical signal to access router 40.

In this example, the second optical signal travels round trip from access router 40 to a given one of CPEs 44 and back to access router 40. In this case, the distance between access router 40 and the CPE may be less than unidirectional point-to-point optical communication. Nevertheless, distances of at least 25-30 km between access router 40 and CPEs 44 are achievable using current fiber optic technologies.

In this optical network configuration, access router 40 need not perform any upstream time slot scheduling to allocate upstream bandwidth for transmissions from each of CPEs 44. In a system in which a single downstream optical signal is power split evenly between the CPEs, upstream signals from more than one CPE at the same time may cause signal interference. Therefore, in that type of system, a scheduler in the access router is responsible for granting separate time slots during which the CPEs can transmit data upstream to the access router. In many bandwidth allocation schemes, fixed time slots are provided to each of the CPEs to handle the largest amount of upstream data. However, data requirements can be very bursty leading to a large amount of wasted bandwidth during the low data times in order to have the capacity to handle the heavy data times.

In the illustrated example of FIG. 2, these concerns are alleviated because each of CPEs 44 transmits upstream data using a different wavelength optical signal. In this case, after passing through comb filter 42 in an upstream direction, the different wavelength optical signals can be transmitted upstream through the same fiber without interfering with one another.

In this way, multiple CPEs 44 are able to achieve bi-directional communication with access router 40 through a single optical interface 43 even though the CPEs 44 are optical emitter (e.g., laser) free. Moreover, each of CPEs 44 may utilize a broadband modulator, i.e., a modulator that is relatively insensitive to wavelength, to modulate the upstream optical carrier signal received from access router 40. As such, each of CPEs 44 need not include specialized interface components tailored for particular wavelengths and may avoid the cost associated with laser-based transmitters. As such, low-cost CPEs 44 may be utilized that may be easily deployed to subscribers without regard to, or needing configuration for, specific wavelengths or ports of the comb filters used within the access network. In this way, a low-cost, low-complexity, highly-scalable access network may be achieved that provides high-speed, bi-directional optical communications.

Figure 3:
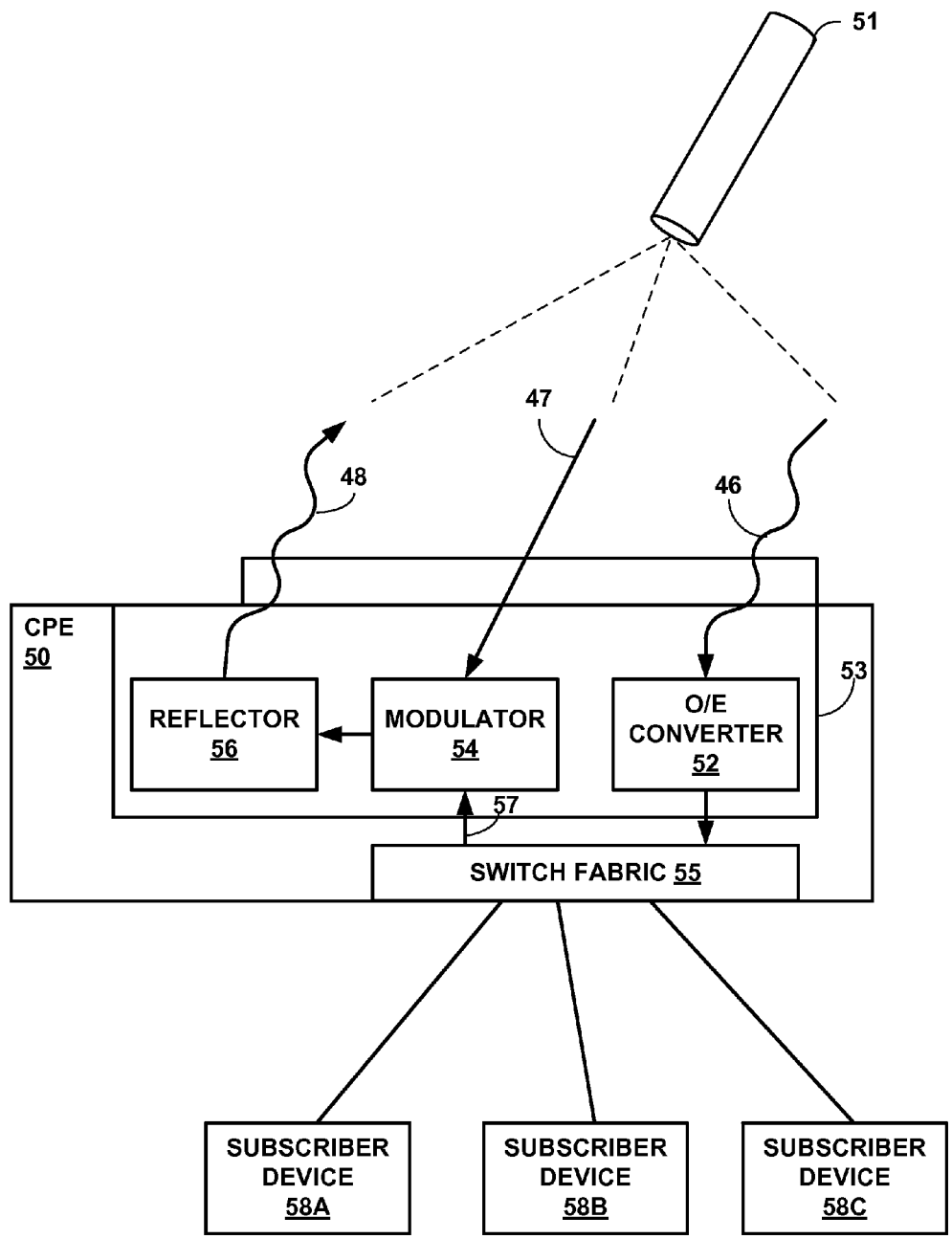
FIG. 3 is a block diagram illustrating an example of a customer premise equipment of FIG. 2.

FIG. 3 is a block diagram illustrating example customer premise equipment 50 which may be any of CPEs 32, 38 or 44 of FIGS. 1-2. As shown in the example of FIG. 3, CPE 50 comprising an optical interface module 53 to receive from fiber 51 a modulated optical transmit signal 46 and an unmodulated optical receive signal 47 for any of the plurality of pairs of optical communication signals output by the optical interface of the access router. That is, optical interface module 53 may, for example, be coupled to any of the ports of the comb filter(s) (e.g., any port 45 of comb filter 45). Optical interface module 53 includes a receive module that provides an optical to electrical converter 52 to demodulate the modulated optical transmit signal 46 into inbound symbols for delivery to subscriber devices 58 by switch fabric 55. In addition, optical interface 53 of CPE 50 includes a transmit module having an optical modulator 54 and reflective optics 56 to modulate the unmodulated optical receive signal 47 in accordance with electrical data signal(s) 57 from subscriber devices 58 and reflect a modulated optical receive signal 48 to communicate outbound data symbols to the access router. Although shown for purposes of example as traversing a common fiber 51, modulated optical transmit signal 46 and an unmodulated optical receive signal 47 may be communicated through separate fibers.

FIG. 4 is a schematic diagram illustrating a second example of an optical access network of FIG. 1 in accordance with one or more techniques of this disclosure. Access router 60 and CPEs 66A-66M ("CPEs 66") of FIG. 4 may represent, for example, any of the access routers and CPEs of FIG. 51-3.

In the example illustrated in FIG. 4, optical access network 61 comprises a PON that includes a wave division multiplexing (WDM) comb filter 62 that divides an optical signal from into different wavelengths without dividing the power. In addition, optical network 61 also includes passive optical splitters 64A-64N ("optical splitters 64") on each fiber between comb filter 62 and CPEs 66 to further divide the optical signal. In this example, comb filter 62 may direct wavelength-specific optical signals to N different fibers (e.g., forty) via ports 65A-65N ("ports 65"), and the optical signal on each fiber may be split into M different optical signals of the same wavelength to a set of M CPEs 66. In this way, access network 61 utilizes an optical splitter 64 for the optical communications associated with each of the different wavelengths provided by optical interface 63 so as to provide the upstream and downstream optical signals of the same wavelength to a set of M different CPEs. In one example a 40-port comb filter 62 is used with 32-way optical splitters 64. In this way, a single optical interface 63 of access router 60 may service up to 1280 CPEs.

In this configuration, the optical signals at each different wavelength may be power split between M CPEs. Accordingly, optical interface 63 of access router 60 provides an execution environment for a plurality of schedulers, one for each port 65 of comb filter 62 coupled to the optical interface 63, i.e., one for each of the N wavelengths. Each of the N schedulers dynamically services data transmission requests for the set of CPEs 66 communicating at a particular given wavelength, i.e., the set of CPEs 66 coupled to a common port 65 of comb filter 62 by an optical splitter 64, thereby allowing access router 60 to dynamically schedule upstream data transmissions so as to utilize otherwise unused communication bandwidth. For example, in reference to FIG. 4, a first scheduler executing on optical interface 63 dynamically schedules upstream communications from each of CPEs 66 connected to optical splitter 64A and communicating with access router 60 via a first wavelength associated with port 65A of comb filter. Similarly, a second scheduler executing on optical interface 63 dynamically schedules upstream communications from a second set of CPEs (not shown) connected to optical splitter 64B and communicating with access router 60 via a second wavelength associated with port 65B of comb filter.

In some cases, the scheduler may allocate the bandwidth based on a fixed allocation scheme to each of CPEs 66 to accommodate the highest traffic situations. In other cases, the scheduler may dynamically allocate the bandwidth based on a reported or requested amount of upstream data ready for transmission at each of CPEs 66. Each of the schedulers schedules both (i) downstream communication by the respective modulated optical transmit signal output by optical interface 63 to the corresponding set of CPEs connected to that port of comb filter 62 (i.e., egress scheduling), and (ii) upstream communication by the respective unmodulated optical receive signal output by the optical interface to the CPEs connected to a given port 65 of comb filter 62 (i.e., ingress scheduling). The schedulers schedule the upstream communication from each of the CPEs connected to a given port 65 of the comb filter (e.g., upstream communications from CPEs 66 connected to the same optical splitter 64A and the same port 65A of comb filter 62) based on a corresponding round trip delay time for the optical receive signal to the CPEs. In this way, each scheduler ensures that output symbols transmitted by the CPEs communicating at the same wavelength arrive at access router 60 at different communication time slots.

Figure 5:
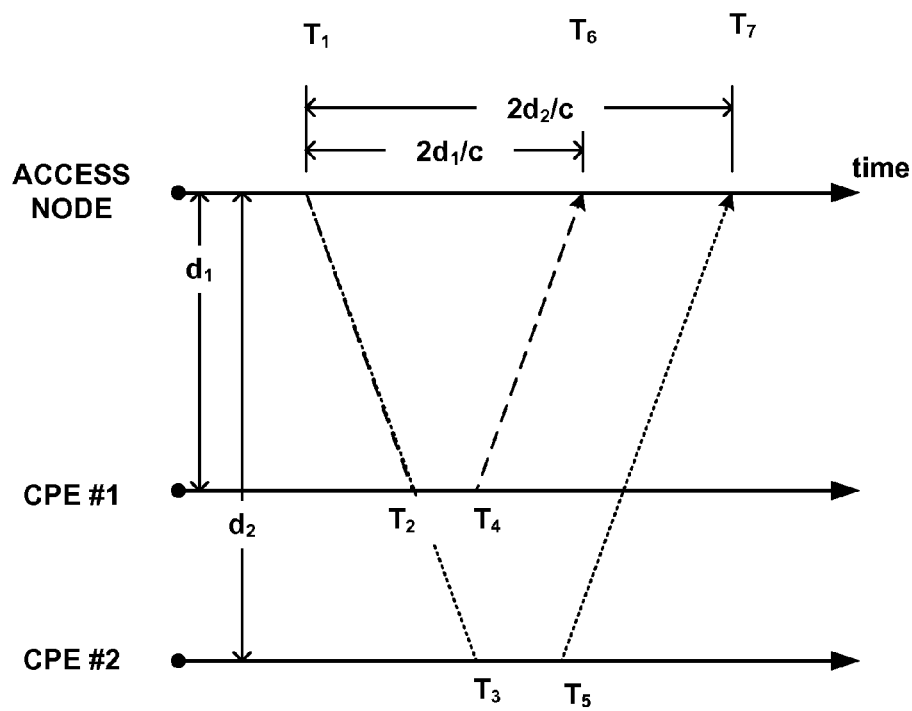
FIG. 5 is an example distance timing diagram illustrating downstream and upstream optical signals as a function of distance

FIG. 5 is an example distance-timing diagram illustrating downstream and upstream optical signals as a function of distance. As discussed, each of the CPEs may perform reflective optics to generate upstream modulated signals through the optical splitter and the comb filter to the access router. As described above, the second optical signal is constantly on and precisely controlled by a crystal oscillator at the access router. At a fixed distance, e.g., the distance between the access router and a given CPE, an optical signal with a precisely controlled given wavelength will be reflected back to the access router after a constant time delay assuming the index of refraction does not change due to environmental concerns, e.g., temperature. In this way, the scheduler for communicating with a set of CPEs at a given wavelength may calculate when upstream signals will be reflected back from each of the CPEs and can allocate the bandwidth according to the reflection delay times for each of the CPEs.

In the example of FIG. 5, the optical interface of the access router transmits an unmodulated optical receive signal at a given wavelength at an initial time $T_1$. The unmodulated optical receive signal is received by a first CPE (CPE #1) at a time $T_2$ and by a second CPE (CPE #2) at a time $T_3$. In this example, the length of the fiber optic cable from the access router to CPE #1 is less than the length from the access router to CPE #2. As such, the unmodulated optical receive signal arrives at CPE #2 at time $T_3$ that is greater than time $T_2$. As such, CPEs #1 and #2 modulate and reflect back the receive signal at different times, i.e., $T_4$ and $T_5$ in this example. The modulated receive signals, including the data symbols carried thereby, arrive at the access router at times $T_6$ and $T_7$.

As illustrated in in the example of FIG. 5, at a distance $d_1$ between the access router and the first CPE, the precisely controlled optical signal will reflect back to the access router with a roundtrip delay of $(2*d_1)/c$, where c is the speed of light. Additionally, at a distance $d_2$ between the access router and the second CPE, the precisely controlled optical signal will reflect back to the access node with a roundtrip delay of $(2*d_2)/c$. In this way, a scheduler in the access router may allocate upstream time slots for the first CPE such that the fiber from the splitter to the access router is available at a time that is $(2*d_1)/c$ after a downstream data transmission toward the CPEs associated with the precisely controlled wavelength. The scheduler may also allocate upstream time slots for the second CPE such that the fiber is available for upstream data from the second CPE at a time that is $(2*d_2)/c$ after the downstream data transmission.

The scheduler in the access router may use the precise control of each wavelength optical signal to schedule the upstream transport time slots to each of the CPEs. That is, for each wavelength, the corresponding scheduler maintains a forward looking schedule of inbound communications from each CPE. When constructing the schedule, the scheduler may first allocate a fixed amount of minimum guaranteed bandwidth to each of the CPEs. In one example, this fixed bandwidth may comprise approximately 10% of the nominal bandwidth available to each of the CPEs for the given wavelength. This fixed bandwidth may be used to send upstream bandwidth requests to the access router, control-plane signaling and any low latency data transmissions. The scheduler may then allocate the remaining bandwidth according to bandwidth requests from each of the CPEs. Moreover, when assigning time slots, the scheduler may consider the upstream reflection delay time associated with each of the CPEs so as to construct an optical schedule for servicing the requests. In this way, the scheduler allows the CPEs to contend for the remaining bandwidth, thereby achieving a statistical multiplexing gain of otherwise unutilized bandwidth.

Figure 6:
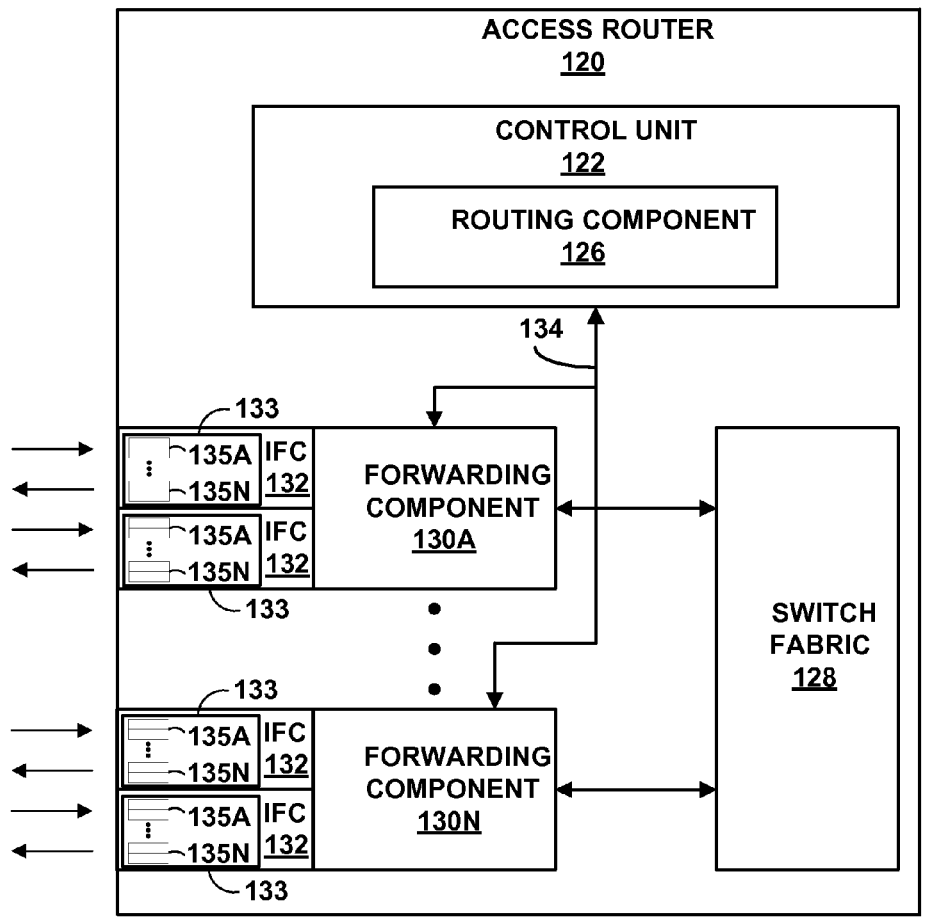
FIG. 6 is a block diagram illustrating an example access router having an optical interface component that utilizes a plurality of ingress schedulers.

FIG. 6 is a block diagram illustrating an example access router 120 that provides an optical interface capable of optically communicating with a plurality of different customer premise equipment (CPEs) through a common optical interface in accordance with the principles described herein. Access router 120 may comprise a router such as one of access routers 28, 36 of FIG. 1, a core router, or other network device. In this example, access router 120 includes a control unit 22 that includes a routing component 126 that provides control plane functionality for access router 120. Access router 120 also includes a plurality of forwarding components 130A-130N ("forwarding components 130") and a switch fabric 128 that collectively provide a data plane for forwarding network traffic. Forwarding components 130 receive and send data packets via interface cards 132. IFCs 132 are physical interface cards. In other embodiments, each of forwarding components 130 may comprise more or fewer IFCs. Although not shown, forwarding components 130 may each comprise a central processing unit (CPU) and a memory. Switch fabric 128 provides a high-speed interconnect for forwarding incoming data packets to the correct one of forwarding components 130 for transmission over a network. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Routing component 126 provides control plane functions for storing network topology in the form of routing tables or other structures, executing routing protocols to communicate with peer routing devices and maintain and update the routing tables, and providing a management interface to allow user access and configuration of access router 120. Control unit 122 provides an operating environment for routing component 126 and may be implemented solely in software, or hardware, or may be implemented as a combination of software, hardware or firmware. For example, control unit 122 may include one or more processors which execute software instructions. In that case, routing component 126 may include various software modules or daemons (e.g., one or more routing protocol processes, user interfaces and the like), and control unit 122 may include a computer-readable storage medium, such as computer memory or hard disk, for storing executable instructions.

Routing component 126 is connected to each of forwarding components 130 by a dedicated internal communication link 134. For example, dedicated link 134 may comprise a Gigabit Ethernet connection. Routing component 126 maintains routing information that describes a topology of a network, and derives a forwarding information base (FIB) in accordance with the routing information. In general, the routing information represents the overall topology of the network. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, the FIB is generated based on selection of certain routes within the network and maps packet key information (e.g., destination information and other select information from a packet header) to one or more specific next hops and ultimately to one or more specific output interfaces (e.g., physical interface ports) of IFCs 132. Routing component 126 may generate the FIB in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

Routing component 126 communicates data representative of a software copy of the FIB into each of forwarding components 130 to control forwarding of traffic within the data plane. This allows the software FIB stored in memory (e.g., RAM) of in each of forwarding components 130 to be updated without degrading packet-forwarding performance of access router 120. In some instances, routing component 126 may derive separate and different software FIBs for each respective forwarding components 130. In addition, one or more of forwarding components 130 include application-specific integrated circuits (ASICs) (not shown) that forwarding components 130 program with a hardware-copy of the FIB based on the software FIBs (i.e., hardware versions of the software FIBs) copied to each respective forwarding component 130. Each of the forwarding components 130 in access router 120 may include one or more egress schedulers for scheduling the forwarding of outbound packets to IFCs 132.

One or more of IFCs 132 may provide optical interfaces 133 as described herein, such as optical interfaces 43 of FIGS. 2 and 63 of FIG. 4. Each of the optical interfaces 133 of access router 120 may comprise a plurality of pairs of optical emitters 135A-135N, e.g., lasers, for communicating at a plurality of different wavelengths. Each of the pairs of optical emitters 135A-135N includes a first optical emitter that outputs the modulated optical transmit signal at one of the wavelengths and a second optical emitter that outputs the unmodulated optical receive signal at the same one of the wavelengths.

Further, each of the optical interfaces includes one or more ingress schedulers. The ingress schedulers may operate as described above with respect to FIGS. 4 and 5 to allocate upstream bandwidth and time slots for CPEs associated with an optical signal at a given wavelength. For example, in the case where access router 120 includes forty optical sources controlled at forty different wavelengths, an optical interface may includes forty schedulers, one for each optical source.

Figure 7:
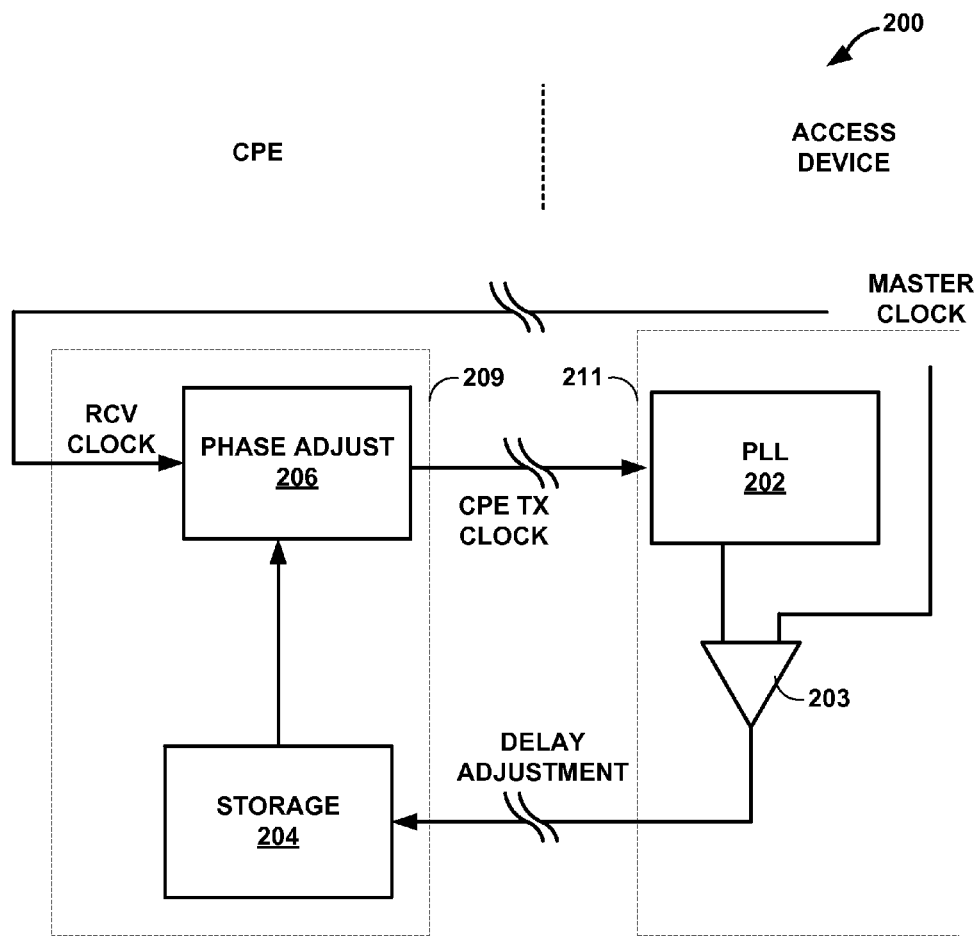
FIG. 7 is a block diagram illustrating one example of a distributed phase lock loop (PLL) for the network systems described herein.

FIG. 7 is a block diagram illustrating one example of a distributed phase lock loop (PLL) for the network systems described herein. In one example, since the CPEs use reflective optics, the optical interface of the access router and the CPEs operate as distributed phase lock loops to tightly manage the clocking scheme used for transmit and receive optical signals. This may allow the interfaces described herein to reduce time delays (buffers) that may otherwise typically be used between allocated time slots since the access router and the CPEs may operate based on the same highly accurate clock. At a CPE, the transmission clock may be phase shifted to reduce gaps between transmission time slots to be only a few picoseconds, for example.

In the example of FIG. 7, distributed PLL 200 includes a first component 211 in which a phase lock loop 202 operates within the optical interface of the access router. PLL 202 locks onto the CPE transmit clock as recovered from an inbound receive signal reflected by the CPE. Comparator 203 outputs a delay adjustment based on a comparison of the current CPE transmit clock and the master clock used by the access router when sending the unmodulated optical receive signal to the CPE. In this way, PLL 202 locks on the symbol rate from the CPE and feeds into phase detector comparator 203 along with the master clock at the access router to determine the amount of the delay that can be removed from the CPE clock. The CPE includes a second component 209 of the distributed phase lock loop in which a storage 204 of the CPE stores any delay adjustment and phase adjustment component 206 adjusts, in real-time, the recovered receive clock used by the CPE when modulating and reflecting the receive signal back to the access router.

In some examples, the access network described herein uses an initialization process by which customer premise equipment (CPEs) register with the access router. For example, an access router may periodically (e.g., every few seconds) output an identification beacon ("IDENT") during which each CPE coupled to the access router either replies with a unique identification during a sub-timeslot of the identification timeslot. For example, the identification timeslot may be divided into thirty-two sub timeslots during which each of the 32 CPEs coupled to a given optical splitter for a given wavelength may register with the access router. In some examples, in the event the CPE has already registered and been assigned a time slot, the CPE replies with data during the sub-time slot.

Various embodiments of the invention have been described. These and other embodiments are within the scope of the following claims.

The invention claimed is:

1. A network system comprising:
    an access device comprising an optical interface module that outputs a plurality of pairs of optical communication signals, each of the pairs of optical communication signals comprising a modulated optical transmit signal and an unmodulated optical receive signal, each of the pairs of optical communication signals having a different wavelength; and
    a customer premise equipment (CPE) comprising an optical interface module to receive the modulated optical transmit signal and the unmodulated optical receive signal for any of the plurality of pairs of optical communication signals, wherein the optical interface module includes a receive module to demodulate the modulated optical transmit signal into inbound symbols and a transmit module having an optical modulator and reflective optics to modulate the unmodulated optical receive signal in accordance with a data signal and reflect a modulated optical receive signal to communicate outbound data symbols to the access device,
    wherein the access device comprises a plurality of schedulers, each of the schedulers corresponding to a different set of one or more CPEs, and
    wherein each of the schedulers schedules, for a respective one of the pairs of optical communication signals, downstream communication to the respective set of CPEs by the modulated optical transmit signal and upstream communication from the respective set of CPEs by the unmodulated optical receive signal.

2. The network system of claim 1, wherein the optical modulator of the transmit module of the CPE comprises a broadband modulator that is independent of wavelength.

3. The network system of claim 1,
    wherein the optical interface module of the access device comprises a plurality of pairs of optical emitters, and
    wherein each of the pairs of optical emitters having a first optical emitter that outputs the modulated optical transmit signal at one of the wavelengths and a second optical emitter that outputs the unmodulated optical receive signal at the same one of the wavelengths.

4. The network system of claim 1, wherein the optical interface module of the access device includes an optical interface to provide each of the pairs of optical communication signals to a common optical fiber.

5. The network system of claim 1,
    wherein the optical interface module of the access device includes an optical interface having a first optical interconnect to couple to a first optical fiber and a second optical interconnect to couple to a second optical fiber, and
    wherein the optical interface module is configured to provide the modulated optical transmit signal for each of the pairs of optical communication signals to the first optical fiber and the non-modulated optical receive signal for each of the pairs of optical communication signals to the second optical fiber.

6. The network system of claim 1, further comprising a comb filter coupled between the access device and a plurality of CPEs, wherein that comb filter wave division multiplexes each of the pairs of optical communication signals between the access device and the plurality of CPEs such that each of the CPEs receives a different one of the pairs of optical communication signals at a different wavelength.

7. A network system comprising:
    an access device comprising an optical interface module that outputs a plurality of pairs of optical communication signals, each of the pairs of optical communication signals comprising a modulated optical transmit signal and an unmodulated optical receive signal, each of the pairs of optical communication signals having a different wavelength;

a plurality of customer premise equipment (CPEs), each of the CPEs comprising an optical interface module to receive the modulated optical transmit signal and the unmodulated optical receive signal for any of the plurality of pairs of optical communication signals, wherein the optical interface module includes a receive module to demodulate the modulated optical transmit signal into inbound symbols and a transmit module having an optical modulator and reflective optics to modulate the unmodulated optical receive signal in accordance with a data signal and reflect a modulated optical receive signal to communicate outbound data symbols to the access device;

a comb filter coupled between the access device and the plurality of CPEs that wave division multiplexes each of the pairs of optical communication signals from a common optical fiber to a plurality of N ports, each of the N ports communicating a different one of the pairs of optical communication signals at a different one of the wavelengths; and a respective optical splitter coupled to each of the N ports of the comb filter, each of the optical splitters configured to split the modulated optical transmit signal and the unmodulated optical receive signal for the respective port of the comb filer into a plurality of M sets of the optical transmit signals and the unmodulated optical receive signals, each of the optical transmit signals and the unmodulated optical receive signals of the same set having the same wavelength, wherein each of the CPEs is coupled to a different port of the optical splitters.

8. The network system of claim 7, further comprising a plurality of N schedulers executing on the optical interface module of the access device, wherein each of the schedulers corresponds to a different one of the N ports of the comb filter and schedules both (i) downstream communication by the respective modulated optical transmit signal to the corresponding set of CPEs connected to that port of the comb filter, and (ii) upstream communication by the respective unmodulated optical receive signal output to the CPEs by the access device.

9. The network system of claim 8, wherein the schedulers schedule the upstream communication from each of the CPEs connected by one of the optical splitters to a given port of the comb filter based on a corresponding round trip delay time for the optical receive signal output to the CPEs by the access device so the output symbols transmitted by the CPEs arrive at the access device at different communication time slots.

10. A network system comprising:

an access device comprising an optical interface module that outputs a plurality of pairs of optical communication signals, each of the pairs of optical communication signals comprising a modulated optical transmit signal and an unmodulated optical receive signal, each of the pairs of optical communication signals having a different wavelength; and a plurality of customer premise equipment (CPEs), each of the CPEs comprising an optical interface module to receive the modulated optical transmit signal and the unmodulated optical receive signal for any of the plurality of pairs of optical communication signals, wherein the optical interface module includes a receive module to demodulate the modulated optical transmit signal into inbound symbols and a transmit module having an optical modulator and reflective optics to modulate the unmodulated optical receive signal in accordance with a data signal and reflect a modulated optical receive signal to communicate outbound data symbols to the access device, wherein the access device comprises a first component of a distributed phase lock loop that locks onto a transmit clock of the optical receive signal reflected back from a first one of the CPEs and output a delay adjustment based on a comparison of the transmit clock of the first one of the CPEUs and a master clock, and wherein the first one of the CPEs comprises a second component of the distributed phase lock loop that adjusts the transmit clock based on the delay adjustment received from the access device.

11. The network system of claim 10, wherein the second component of the distributed phase lock loop that recovers a receive clock from the unmodulated optical receive signal from the access device and generates the transmit clock based on the recovered receive clock and the delay adjustment.

12. A method comprising:

executing a plurality of schedulers on an access device to schedule output, with an optical interface module of the access device, a plurality of pairs of optical communication signals, each of the pairs of optical communication signals comprising a modulated optical transmit signal and an unmodulated optical receive signal, each of the pairs of optical communication signals having a different wavelength, wherein each of the schedulers corresponds to a different set of one or more customer premise equipment (CPEs) receiving a respective one of the pairs of optical communication signals;

receiving, with an optical interface of a first one of the CPEs, the modulated optical transmit signal and the unmodulated optical receive signal of one of the plurality of pairs of optical communication signals;

demodulating, with the optical interface of the first one of the CPEs, the modulated optical transmit signal into inbound symbols;

modulating, with the optical interface of the first one of the CPEs, the unmodulated optical receive signal in accordance with a data signal to produce a modulated optical receive signal of outbound data symbols; and reflecting, with the optical interface of the first one of the CPEs, the modulated optical receive signal back to the access device to communicate the outbound data symbols to the access device.

13. An access device comprising:

a plurality of interfaces;

a switch fabric to forward network packets between the plurality of interfaces; and a plurality of schedulers executed by the access device, wherein at least one of the interfaces comprises an optical interface module that outputs a plurality of pairs of optical communication signals, wherein each of the pairs of optical communication signals comprises a modulated optical transmit signal to transmit outbound symbols to a respective set of one or more customer premise equipment (CPEs) and an unmodulated optical receive signal to receive inbound symbols from the respective set of CPEs, and wherein each of the schedulers corresponds to a different one of the sets of CPEs and schedules, for a respective one of the pairs of optical communication signals, downstream communication to the set of CPEs by the modulated optical transmit signals and upstream communication from the CPEs by the respective unmodulated optical receive signal.

14. The access device of claim 13,
wherein, for each of the pairs of optical communication signals, the modulated optical transmit signal and the unmodulated optical receive signal have a same one of the plurality of wavelengths, and
wherein each of the pairs of optical communication signals have a different one of a plurality of wavelengths.

15. The access device of claim 13
wherein the optical interface module of the access device comprises a plurality of pairs of optical emitters, and
wherein each of the pairs of optical emitters having a first optical emitter that outputs the modulated optical transmit signal at one of the wavelengths and a second optical emitter that outputs the unmodulated optical receive signal at the same one of the wavelengths.

16. The access device of claim 13, wherein the optical interface module of the access device includes an optical interface that provides each of the pairs of optical communication signals to a common optical fiber.

17. The access device of claim 13,
wherein the optical interface module of the access device includes an optical interface having a first optical interconnect to couple to a first optical fiber and a second optical interconnect to couple to a second optical fiber, and
wherein the optical interface module is configured to provide the modulated optical transmit signal for each of the pairs of optical communication signals to the first optical fiber and the non-modulated optical receive signal for each of the pairs of optical communication signals to the second optical fiber.

18. The access device of claim 13, wherein the schedulers schedule the upstream communication from each of the CPEs based on round trip delay times for the unmodulated optical receive signals output to the CPEs by the access device so output symbols transmitted by the CPEs arrive at the access device at different communication time slots.

* * * * *